United States Patent [19]

Linko, III et al.

[11] 4,137,949

[45] Feb. 6, 1979

[54] METHOD OF MAKING A FIRE RETARDANT CONDUIT

[75] Inventors: Peter J. Linko, III, Cincinnati; Stanley C. Harrier, Terrace Park, both of Ohio

[73] Assignee: General Electric Company, Cincinnati, Ohio

[21] Appl. No.: 795,857

[22] Filed: May 11, 1977

[51] Int. Cl.² .................... F16L 11/12; F16L 9/14; B32B 1/08

[52] U.S. Cl. .................... 138/125; 138/141; 138/DIG. 2; 156/86; 156/149; 156/165; 156/289

[58] Field of Search ............ 138/124, 125, 140, 141, 138/144, 149, DIG. 2, DIG. 7; 156/86, 149, 165, 289; 264/103

[56] References Cited

U.S. PATENT DOCUMENTS

| 2,653,887 | 9/1953 | Slayter | 138/DIG. 2 |
|---|---|---|---|
| 2,760,549 | 8/1956 | Nash et al. | 156/149 |
| 3,206,344 | 9/1965 | Elkins, Jr. | 156/86 |
| 3,295,559 | 1/1967 | Beasley et al. | 138/141 |
| 3,573,123 | 3/1971 | Siegel et al. | 138/141 |
| 3,691,000 | 9/1972 | Lalnin | 138/DIG. 2 |
| 3,812,885 | 5/1974 | Sajben et al. | 138/125 |
| 3,830,261 | 8/1974 | Hochberg et al. | 138/141 |
| 3,883,384 | 5/1975 | Hopkins | 156/149 |

FOREIGN PATENT DOCUMENTS 36032 11/1970 Japan ........................................ 156/86

*Primary Examiner*—Richard R. Stearns
*Attorney, Agent, or Firm*—Lee H. Sachs; Derek P. Lawrence

[57] ABSTRACT

A conduit such as a metal or flexible material fuel or oil tube is provided with a barrier to metallic fires through the use of the combination of carbon or graphite impregnated with a polymer resin to provide insulative as well as ablative characteristics.

3 Claims, 3 Drawing Figures

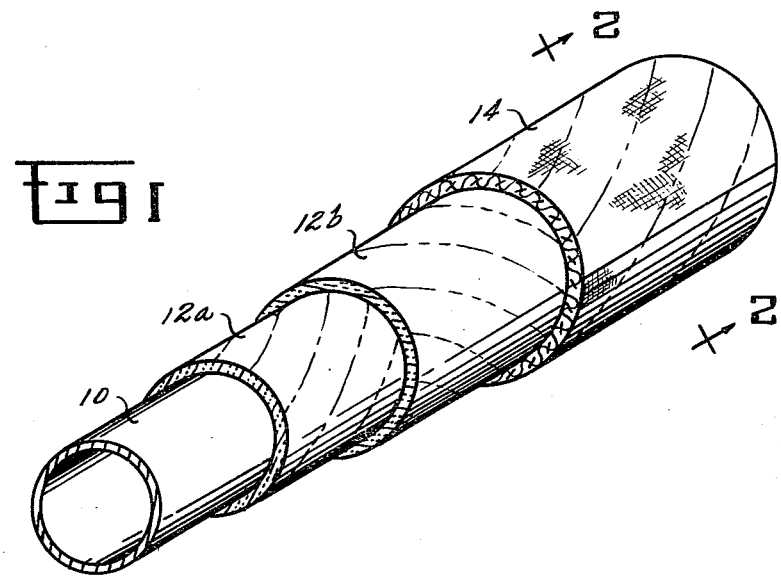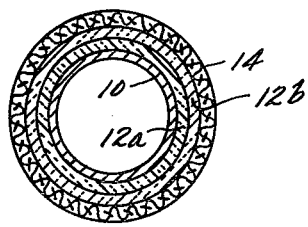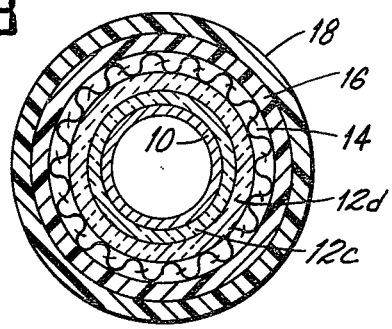

METHOD OF MAKING A FIRE RETARDANT CONDUIT

The invention herein described was made in the course of or under a contract, or a subcontract thereunder, with the U.S. Department of the Air Force.

FIELD OF THE INVENTION

This invention relates to fire-retardant barriers and, more particularly, to such a barrier for conduits capable of resisting metallic fires for example of the type created by burning titanium particles.

BACKGROUND OF THE INVENTION

It has been recognized in the operation of such power-producing apparatus as gas turbine engines that friction between rotating and stationary cooperating members can generate metallic particles which can be accumulated or entrapped downstream of the point of friction. Of particular interest has been titanium debris which can result from planned or occasional interference between compressor blades and opposed, cooperating portions of the compressor, rotating relative one to the other. Because of the highly oxidizing, high-velocity, pressure conditions which can exist in a gas turbine engine, titanium debris, once ignited by some unusual occurrence, can burn with high intensity and can, in some cases, penetrate walls of engine casings even though its burning duration is relatively short. If such penetration occurs in the vicinity of fuel or lubrication conduits, penetration of such conduits can occur. This can result in still further spread of the fire, inhibiting its containment and mechanisms to extinguish it.

Further complicating such problems in aircraft gas turbine engines is the proximity of such conduits to casings of the engine and the complex configuration of such conduits in order to provide fuel and lubricant to selected portions of the apparatus. Therefore, a system which is sufficiently fire retardant to avoid penetration of burning metallic particles must be relatively thin in order to be useful in such apparatus.

SUMMARY OF THE INVENTION

It is a principal object of the present invention to provide an improved fire-retardant conduit which includes a fire barrier capable of retarding burning metallic particles from penetration through a wall of the conduit.

Another object is to provide a method for making such a fire-retardant conduit.

These and other objects and advantages will be more clearly understood from the following detailed description, examples and a drawing, all of which are intended to be representative of rather than in any way limiting on the scope of the present invention.

Briefly, the improved fire-retardant conduit of the present invention, in one form, comprises a conduit wall and a composite conduit fire-retardant barrier about the wall. The composite barrier comprises a plurality of layers of a cloth woven from carbon fibers and impregnated with a binder, preferably an epoxy or polyimide resin for high temperature operation. The layers of cloth, which are intended herein to include sheets, strips, knitted sleeves, preformed shapes, etc., are disposed, such as by wrapping or slipping about the conduit wall. Subsequently, the impregnated material is cured in place. In another form, there is disposed about the carbon cloth layers, which form a first portion, at least one layer of a second cloth woven from glass fibers and impregnated with a binder, for example that used to impregnate the carbon cloth, to provide a second portion. Thus, there is provided a composite, multi-ply barrier about the conduit wall.

A method for making such a fire-retardant conduit, in one preferred form, includes the spiral wrapping of strips of the carbon cloth, each layer in an alternating direction from the preceding layer, to form the plurality of layers of the carbon cloth. Then, if desired, at least one layer of the second or glass cloth is wrapped in the same manner. Thereafter, a release film, such as of polytetrafluoroethylene material commonly used in the art, is wrapped about such layers of cloth. Over the release film there is applied, such as by wrapping, a heat shrinkable plastic material, such as a polyester film, one form of which is commercially available as Mylar film. Such film then is selectively heated to shrink about the release film and to hold the layers of cloth tightly about the conduit wall. After locally perforating the release film and shrinkable material to permit egress of reaction product, this assembly then is cured at that temperature recommended for the binder or binders which impregnate the cloth layers, for example about 350° F. (about 177° C.).

In another form, the method includes providing pre-impregnated, knitted sleeves of carbon cloth and, if desired, glass cloth. Such sleeves are slipped over the conduit wall and each other in sequence. This provides the desired build-up prior to application of the release and shrink films and heat for curing.

DESCRIPTION OF THE DRAWING

FIG. 1 is a perspective, partially sectional view of one form of the conduit of the present invention showing layers of a carbon cloth and a second or glass cloth;

FIG. 2 is a sectional view taken on line 2—2 of FIG. 1; and

FIG. 3 is a sectional view of another form of the present invention during processing.

DESCRIPTION OF THE PREFERRED EMBODIMENTS

The element carbon sublimes at a temperature greater than about 3500° C. and has been shown effective in resisting thermal penetration for short times under high heat flux conditions. Bulk carbon is brittle and has relatively poor thermal shock resistance to extreme thermal gradients created by bombardment of high velocity burning titanium. A cloth or sleeve woven or knitted from carbon fiber is flexible and resilient. However, such a cloth is porous and can easily be penetrated by mechanical displacement and fracture of fibers during bombardment by high velocity particles and gas.

Flame spray tests conducted in the evaluation of the present invention have shown that a matrix of a binder such as rubber, epoxy, polyimide, phenolic, polyester, etc., will hold the cloth in position such that the thermal barrier resistance of the carbon protects the matrix material, thus providing a barrier with unusual resistance to penetration by a barrage of burning titanium particles. Although a variety of matrix binders can be used, depending on the intended temperature of application, a polyimide resin binder matrix is preferred for application to generally inflexible metallic conduits for such resin's superior long term environmental temperature capability under those operating conditions found in gas turbine engines. For example, the polyimide resin polymer is capable of withstanding about 560° F. (293° C.) service in a gas turbine engine to provide, with the fabric layers in which it is cured, an insulative and ablative fire-retardant barrier. For flexible conduits such as might be used for certain liquid or gas fluid transport, the binder preferably is a flexible elastomer such as a rubber.

During the evaluation of the present invention, in one of its preferred forms, it was recognized that the cured polyimide resin/carbon cloth laminate consisted essentially of 25–40 weight percent polyimide resin with the balance carbon fibers and up to about 20 volume percent voids. It was recognized that below about 25 weight percent polyimide resin, the strength of the composite generally was too low whereas above about 40 weight percent of such resin, the fire-retardant capability on a unit thickness basis was too low because of the reduced volume fraction of carbon fibers. In addition, it is preferred that the graphite form of carbon be used in the cloth.

In respect to that form of the invention in which a laminate of glass cloth and a polyimide resin is used to provide a second portion to the composite barrier, it is preferred that the resin content of the cured laminate be about 30–45 weight percent, with the balance glass fiber and up to about 20 volume percent voids. A lower resin content provides insufficient composite properties; a higher resin content increases the void content, thus reducing the fire-retardant qualities of the composite.

In one specific example, a 1" OD tube, such as 10 in FIGS. 1, 2 and 3, of a material sometimes referred to as 321 stainless steel (AMS5557) was wrapped with six layers of cloth tape woven from graphite fibers, the layers being represented by 12a and 12b in the FIGS. 1 and 2. The fabric requirements for such a tape included a minimum breaking strength of about 20,000 psi (138 MPa) for the warp and about 15,000 psi (103 MPa) for the fill. The fabric tape was preimpregnated with polyimide resin to provide a preimpregnated, not fully cured, material having a resin solids content in the range of about 40–46 weight percent. Each of the six layers of such preimpregnated tape were spiral wrapped, in alternating directions as shown in FIG. 1, around the outer diameter of the tube to provide a first portion of the composite barrier. In FIG. 3 of the drawing, cloth members in the form of knitted sleeves slipped over one another are represented at 12c and 12d. A cloth tape 14 made from woven glass fibers similarly preimpregnated with polyimide resin was then wrapped in two spiral, similarly alternating layers about the six layers of the first or graphite preimpregnated cloth to provide a second portion of the composite barrier. The resin content of such preimpregnate glass fiber cloth, prior to full curing, was in the range of about 35–60 weight percent, including volatiles.

A release layer 16 in FIG. 3 made of Teflon polytetrafluoroethylene material was applied over the glass fiber impregnated tape wrappings and a further wrapping of a shrink tape 18 in FIG. 3 made of Mylar polyester material was applied over the release layer. The shrink tape was heated to cause it to shrink and to hold firmly the underlying layers. After locally perforating the release layer and shrink tape to enable egress of reaction product, the metal tube thus wrapped was heated at a temperature of about 350° F. to cure the binder. After curing, the release film and shrink tape were removed.

The fire-retardant conduit of the present invention was evaluated in a variety of tests to determine the effect of the composite conduit barrier on its operation capability in a gas turbine engine. Such tests as cyclic load, thermal cycle, frequency, vibration, operating temperatures up to as high as about 560° F., etc., showed substantially no adverse effect or apparent changes as a result of application of such a fire-retardant barrier to the conduit. In addition, it has resisted penetration by impacting, burning titanium particles.

Although the present invention has been described in connection with specific examples, it will be recognized by those skilled in the art the variations and modifications of which the invention is capable. For example, variations can be made in the type of carbon or glass fabric or cloth, the matrix binder depending on the intended operating temperature, the number of layers of each type of cloth, etc. It is intended to cover, within the scope of the appended claims, all such variations and modifications.

What is claimed is:

1. A method for making a fire-retardant conduit comprising the steps of:
   providing a plurality of first cloth members made from carbon fibers and preimpregnated with a binder;
   applying each of the plurality of first members in sequence about a conduit wall to provide a first fire-retardant barrier portion;
   providing at least one of a second cloth member made from glass fibers and preimpregnated with a binder;
   applying the glass fiber member about the first member to provide a second fire-retardant barrier portion;
   applying a film of release material over the second portion;
   applying over the release film a shrinkable plastic material having the capability of contracting upon the application of heat;
   applying heat to the shrinkable material sufficient to cause it to contract and to press the first and second barrier portions toward the conduit wall and into contact with each other; and then
   curing the binder impregnated in the members.

2. The method of claim 1 in which:
   the first and the second cloth members are woven cloth strips; and
   the cloth strips are applied by spiral wrapping of the strips, each strip in an alternating direction from the previous strip.

3. The method of claim 1 in which:
   the first cloth members are knitted in the form of sleeves; and,
   the sleeves are applied by slipping, in sequence, each of the plurality of the sleeves about the conduit wall.

* * * * *